Figure 1:
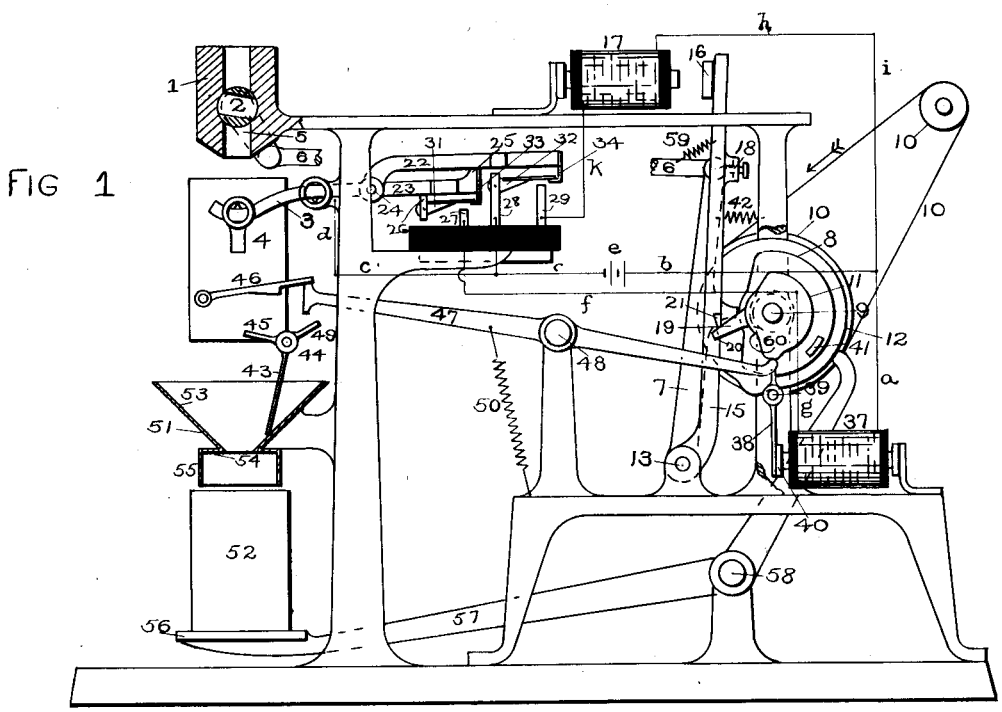

E. G. THOMAS.
AUTOMATIC WEIGHING MACHINE.
APPLICATION FILED AUG. 28, 1897.

1,078,971.

Patented Nov. 18, 1913.

2 SHEETS—SHEET 1.

WITNESSES
W. F. Young
Wm. H. Mitchell

INVENTOR
Edward G. Thomas

E. G. THOMAS.
AUTOMATIC WEIGHING MACHINE.
APPLICATION FILED AUG. 28, 1897.

1,078,971.

Patented Nov. 18, 1913.
2 SHEETS—SHEET 2.

WITNESSES

INVENTOR
Edward G. Thomas

UNITED STATES PATENT OFFICE.

EDWARD G. THOMAS, OF BOSTON, MASSACHUSETTS, ASSIGNOR, BY MESNE ASSIGNMENTS, TO AUTOMATIC WEIGHING MACHINE COMPANY, OF NEW YORK, N. Y., A CORPORATION OF NEW YORK.

AUTOMATIC WEIGHING-MACHINE.

1,078,971.  Specification of Letters Patent.  Patented Nov. 18, 1913.

Application filed August 28, 1897. Serial No. 649,893.

*To all whom it may concern:*

Be it known that I, EDWARD G. THOMAS, a citizen of the United States, residing at Boston, in the county of Suffolk and State of Massachusetts, have invented certain new and useful Improvements in Automatic Weighing-Machines, of which the following is a specification.

My invention relates to automatic weighing apparatus, and is intended more particularly to improve upon prior weighing machines of the power-driven type, as distinguished from those machines in which all the movements of the various parts are effected, directly or indirectly, through the agency of the material weighed. Power-driven machines are particularly advantageous when the desired weights are small, for the reason that the accuracy of the weights obtained is greatly increased by relieving the weighing bucket or other receptacle and its contents from all functions except that of tilting the scale-beam, thereby eliminating sources of error such as friction or other resistance to the descent of the loaded receptacle, when such movement is relied upon to furnish power for cutting off the supply of material, or for operating a dumping device.

The machine herein shown and described is in some respects similar in its construction and mode of operation to the device shown and described in Letters Patent No. 573,247, granted to me December 15, 1896. In that machine, as in the present case, a partial closing of a supply-controlling valve is effected before the desired weight has been wholly delivered, so that the bulk of the material may be delivered to the scale at a rapid rate through a large opening, while the rate of flow at the time of the final closing of the valve may be small, in order to increase the accuracy of the weighing operation. In the aforesaid patented machine, however, the length of time during which the large or main stream of material will run is regulated by the shape and speed of rotation of a cam which controls the initial opening and closing of the valve, so that so long as these two factors remain constant a large stream will run for the same length of time during each weighing operation.

According to my present invention I provide for the shutting off of the large or main stream of material as soon as a definite weight thereof has been delivered to the scale, without reference to the length of time required to deliver it, and I am thereby enabled to weigh loads of any desired size without altering or re-adjusting the machine, and, also, to weigh with greater accuracy when the material is of such a character that it does not flow with regularity, and when the rate at which the material is supplied to the machine is not constant.

My invention, as shown in the accompanying drawings, includes also a dumping bucket and mechanism for compressing the weighed and delivered material into the receptacle provided for it, but my present valve-controlling mechanism may be applied to a machine in which the receptacle for the material is placed upon the scale and weighed with the material, as described in the patent above referred to. Similarly, the dumping and compressing mechanism herein shown and described may be used in connection with the valve-operating mechanism described in said patent, instead of the scale arrangement therein shown.

An automatic weighing apparatus embodying a preferred form of my invention is illustrated in the accompanying drawings, which are in the nature of diagrams, and are not intended to represent the exact details of commercial construction.

Figure 4:
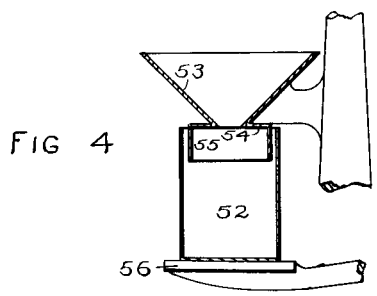
Figure 5:
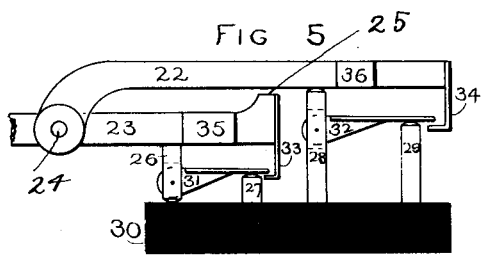
Figure 2:
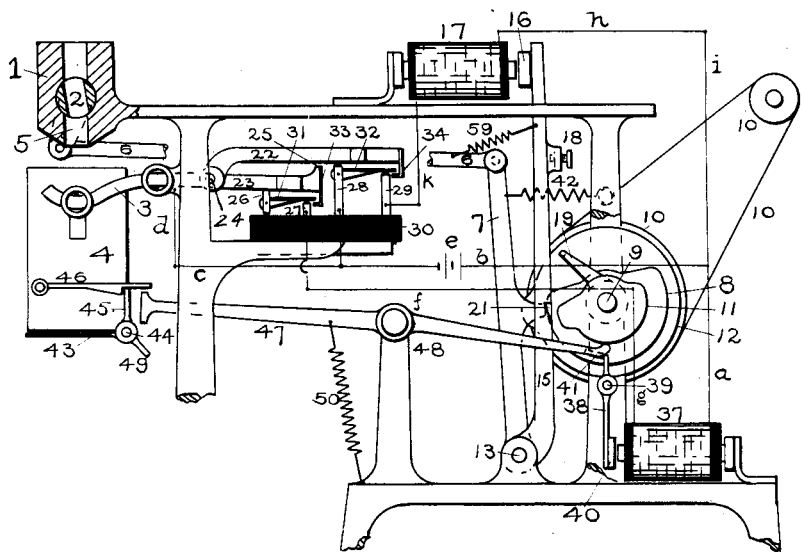
Figure 3:
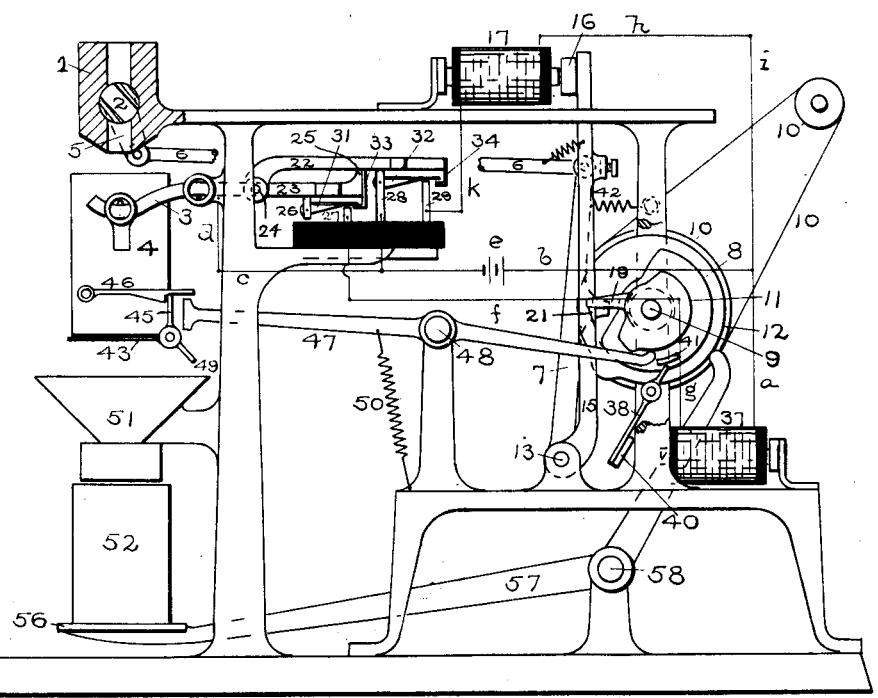

In said drawings, Figures 1, 2 and 3 are side elevations, showing the mechanism in three positions in its cycle of operations. Fig. 4 is a detail view, illustrating the action of a compressing device, and Fig. 5 is an enlarged view of the rear portion of the scale.

The valve-controlling mechanism of the machine shown in the drawings comprises, in combination with power-driven means for opening the valve and with means constantly tending to close the same, two electric circuits adapted to be broken successively by the downward movement of the scale-pan or bucket, and so connected with valve-releasing mechanism that upon the breaking of the first circuit the valve will instantly be closed from its wide-open position to a position in which it will deliver a small or drip stream only, while upon the breaking of the second circuit the closing of said valve will instantly be completed.

Thus, referring to the drawings, 1 represents a tube or pipe leading from a hopper or receptacle of any description (not shown), in which the substance to be weighed is contained and from which it is to be delivered to the machine. The pipe 1 is provided with a stream-controlling device such as a valve 2 and below said pipe is located a bucket 4 carried by a scale-beam 3 suitably supported on knife-edges secured to the frame-work of the machine, as is customary. The valve 2 is provided with an arm 5 by which it may be operated, and for an operating mechanism I prefer to employ a lever 7 pivoted to the frame-work of the machine and connected with the arm 5 by a link 6. These parts are kept under a constant tension tending to close the valve 2 by means such as a spring 42, and for the purpose of moving them in an opposite direction against the tension of said spring and thereby opening the valve I provide a cam 8 secured to a rotatable shaft 9, which is adapted to be driven in the direction shown by the arrow in Fig. 1 by means of a belt and pulley system 10—10, to which power is applied. The driving mechanism preferably comprises a friction clutch of such a nature as to permit the stopping of the rotating shaft 9 at certain points without interrupting the motion of the belt and pulleys 10—10.

It will be apparent that the valve 2 may be held in any desired position either by allowing the lever 7 to follow the contour of the cam 8 as the shaft 9 rotates, and arresting the rotation of said shaft at the proper point, or by arresting the movement of the lever 7 itself in the desired position. I prefer to employ the latter method for controlling the final closing of the valve after it has been brought into the drip stream position, because in order to secure accurate weights the final closing of the valve should be effected by a movement more rapid than that of the rotating cam 8, while for effecting the closing of the valve from its wide-open position into its drip-stream position, the former method may be employed, since this movement may be accomplished with sufficient accuracy within the time required for the sufficient rotation of said shaft 9. Thus, in the machine shown in the drawings, I have provided a lever 38 pivoted at 39 to the frame work of the machine and carrying at its lower end an armature 40, which is arranged to be attracted and held by a fixed electromagnet 37. The upper end of the lever 38 is so located that so long as the armature 40 is held against the magnet 37, said end will lie in the path of a lug 41 secured to the cam 8, and hence will arrest the rotation of the shaft 9 by engaging said lug. The cam 8 is so shaped that when the shaft 9 is arrested as described, the lever 7 will be in its extreme forward position and the valve 2 will therefore be wide open. When the magnet 37 is deënergized as hereinafter described, the lever 38 will be free to be tripped by the lug 41, and the rotation of the shaft 9 will recommence, whereupon the lever 7, following the contour of said cam, will be drawn backward by the spring 42, and will close the valve into its drip stream position, at which point it will be engaged by an ear 18, secured to a lever 15 and projecting into the path of the said lever 7. The lever 15 is pivoted to the machine at 13 and carries an armature 16, arranged to be acted upon and held by a magnet 17, the arrangement being such that the magnet 17 is energized and holds the lever 15 in its forward position at the time when the lever 7 is engaged by the ear 18, as above described, so that after such engagement no further backward movement of the lever 7 will be possible until the lever 15 is released and permitted to move with it. The ear 18 may be provided with an adjusting screw in order to vary the position of the engagement with said lever 7.

In order to hold all the parts of the machine in the drip-stream position until the completion of a load, an arm 19 is secured to the shaft 9 in such manner that its free end 20 will engage a lug 21 upon the lever 15, when said lever is in that position in which its armature is held against the magnet 17, so that as soon as such engagement occurs the rotation of the shaft 9 will be stopped until the lever 15 has been released and has moved sufficiently to withdraw the lug 21 from the path of said arm 19, when said shaft 9 will be started, simultaneously with the final closing of the valve 2. The position of the arm 19 with respect to the cam 8 is such that the engagement of said arm with the lug 21 will occur shortly after the arresting of the lever 7 by the ear 18, the interval being sufficient to enable said cam to move out of the way of the lever 7 before it and the lever 15 are released by the magnet 17.

The magnets 17 and 37 are each included in a suitable energizing circuit, herein shown as provided with a battery $e$ as a source of electric energy, and I provide means whereby the respective circuits through these magnets are successively broken at the proper instants during the weighing operation, preferably as follows: The main beam 23 of the scale 3 has pivoted to it at 24 what may be called a secondary beam 22, which rests upon it at the point 25, except when otherwise supported. These beams are of such weight, or are so loaded by means of adjustable weights 35 and 36 respectively, that when there is no material in the bucket 4 said beams will overbalance the bucket and seek their lowest position, which is that shown in Figs. 2 and 5. The rear end of the main beam 23 will drop until a post 26 secured thereto rests upon a hard rubber block suitably supported on the frame work on the machine, and the secondary beam 22 will drop until it rests upon a post 28, which is of such height that it will arrest the downward movement of said beam 22 before the main beam 23 has reached its lowest position, so that in said position of the beam 23 a portion of the weight of the secondary beam 22 will be carried by the post 28, and hence a quantity of material in the bucket 4 somewhat less in weight than the full amount desired will be able to overbalance the main beam and to cause it to rise until it comes in contact with the secondary beam, when its movement will be arrested until the full weight is made up in the bucket 4.

Each of the beams 22 and 23 is arranged to operate an independent circuit breaker, the circuit breaker for the beam 23 preferably consisting of a lever 31 of aluminum pivoted to the post 26 and adapted to bear at its free end against a pin 27 secured to the hard rubber block above mentioned, or otherwise insulated from the adjacent parts. The circuit breaker of the beam 22 may consist of a similar lever 32 pivoted to the post 28 and adapted to rest at its free end on a pin 29, also secured to said hard rubber block. Lifting fingers 33 and 34 are fastened to the beams 23 and 22 respectively, and at their lower ends are bent under the free ends of the levers 31 and 32 respectively. The circuit breaker of which the lever 31 is the movable member is included in circuit with the battery $e$ and the magnet 37 by wires $a$, $b$, $c$, $d$, $f$ and $g$, and the other circuit breaker is similarly connected with the battery $e$ and the magnet 17 by means of wires $b$, $i$, $h$ and $k$, and the lifting fingers 33 and 34 are so constructed that the lever 31 will instantly be raised from the pin 27 upon the upward movement of the rear end of the beam 23 and before such movement has been arrested by contact with the beam 22 at the point 25, while upon the further movement of said beam 23, carrying with it the beam 22, the lever 32 will be lifted from the pin 29. It will now be apparent that so long as the parts just described are in the position shown in Figs. 2 and 5, the circuits through the two magnets will be closed and said magnets will be energized; and that upon the movement of the beam 23 the circuit through the magnet 37 will be broken and the valve 2 will be closed into the drip stream position; while upon the movement of the beams 22 and 23 together, simultaneously with the completion of the load, the circuit through the magnet 17 will be broken, the valve 2 will instantly be completely closed and the rotation of the shaft 9 will re-commence.

I will now describe the construction of the dumping and compressing mechanism shown in the drawings. The bucket 4 is provided with a swinging bottom 43 hinged thereto at 44 and provided with an arm 45, which is adapted to be engaged by a catch 46 pivoted to the bucket when the bottom 43 is closed. In order to lift the catch without depending upon the momentum of the descending bucket for that purpose, I provide means such as a lever 47 pivoted at 48 and arranged to be acted upon at its other end by a cam 11 which is so shaped as to depress the adjacent end of the lever 47 sufficiently to lift the catch 46 as soon as the shaft 9 commences its rotation after the final closing of the valve 2, this position of the parts being as shown in Fig. 1. The cam 11 is so shaped that after the lapse of a sufficient interval of time to allow the material to run from the bucket, the forward end of the lever 47 will be allowed to be drawn downward by a spring 50 and thereby to be made to close the bottom of the bucket by striking against an arm 49 secured thereto. Under the bucket 4 is placed a funnel 51 secured to the framework of the machine, and arranged to guide the delivered material into a receptacle 52. The funnel 51 comprises a conical portion 53 tapering at the bottom to an orifice which is considerably smaller than the top of the receptacle 52, and below the portion 53 is a flat horizontal portion 54 forming a shoulder and having downwardly projecting sides 55 forming a sort of inverted cup, of such size that it will enter the top of the receptacle 52, as shown in Fig. 4. When the parts are in the position shown in Fig. 1, the sides 55 will form a retaining compartment for any excess of material over the natural capacity of said receptacle, which excess may be forced into the receptacle by placing the same on a platform 56 and providing means whereby said platform may be moved upward a sufficient distance to cause the sides 55 to enter the top of the receptacle 52 and thereby to compress the material contained within said sides into said receptacle. For the purpose of actuating the platform 56, I have shown it mounted on the end of a lever 57 pivoted at 58 and adapted to be engaged at its other end by a cam 12 mounted on the shaft and rotating therewith. The shape of the cam 12 and its position relative to the other parts of the machine are such that the travel of the platform 56 will occur immediately after a load of material has been delivered from the bucket 4.

I will now describe an entire cycle of operations of the machine, starting from the position shown in Fig. 1. When in this position the weighing of a load of material has just been completed, and the shaft 9, released by the backward movement of the lever 15, has rotated sufficiently to cause the cam 11 to depress the rear end of the lever 47, whereby the front end of the lever has been made to lift the catch 46, and the bottom 43 of the bucket 4 has opened and permitted the discharge of the load into the funnel 51 and through it into the receptacle 52. As soon as the contents of the bucket 4 have been discharged, the weighted ends of the main and secondary beams 23 and 22, being no longer overbalanced by the bucket and its contents, will sink to their lowest positions, as shown in Figs. 2 and 5, thereby closing the electric circuits through the magnets 37 and 17 and causing them at once to be energized. The further rotation of the shaft 9 from the position shown in Fig. 1 will permit the rear end of the lever 47 to rise to its extreme upper position, corresponding to the point marked 60 on the cam 11, and the downward movement of the front end of said lever will force down the arm 49 and thus close the bottom 43 of the bucket, whereupon the catch 46 will engage and lock the arm 45. This having been accomplished, the further rotation of the shaft 9 will cause the cam 8 to push forward the lever 7 against the force of the spring 42 until said lever is in its extreme forward position and the valve 2 is wide open, as shown in Fig. 2. At the same time the lever 15 will be drawn forward by the small spring 59 until the armature 16 is brought against the magnet 17, which, being energized, will attract and hold it. The rotation of the shaft 9 will now continue without further change in the position of the valve 2 until the position shown in Fig. 2 has been reached, in which position the lug 41 has been brought against the upper end of the lever 38. Since the armature 40 is now firmly held by the magnet 37, further rotation of the shaft will be arrested and all the parts of the apparatus will remain in the position shown in Fig. 2 so long as the magnet 37 remains energized. During the last part of the rotation of the shaft and immediately after the closing of the bottom of the bucket, the projecting portion of the cam 12 will operate upon the rear end of the lever 57 and thereby elevate the platform 56 and force the receptacle 52 upward against the funnel 51, thereby compressing the delivered material into said receptacle, as above explained.

As soon as the valve 2 is opened, material from the hopper will begin to flow through the pipe 1 into the bucket 4 at a regular and rapid rate, so that enough material will quickly be delivered to overbalance the main beam 23, and said beam will then move until it comes in contact with the secondary beam 22 at the point 25 and will lift by such movement the lever 31 from the pin 27 and thus break the circuit through the magnet 37. The lever 38 will thereby be released and will no longer resist the rotation of the shaft 9, which will then move into the position shown in Fig. 3, when its motion will again be arrested by the engagement of the arm 19 with the lug 21 on the arm 15. During this movement the lever 7, following the contour of the cam 8, will be drawn backward by means of the spring 42 until it comes in contact with the ear 18 of the lever 15, and will simultaneously effect a partial closing of the valve 2 into the position in which a small or drip stream will flow through it.

The shape of the cam 8 is such as to permit the lever 7 to be moved by the spring 42 sufficiently to close the valve 2 completely when the parts are in the position shown in Fig. 3, provided the lever 7 be not restrained from such motion by the lever 15, and such restraining action will be exerted so long as the magnet 17 remains energized. As soon as the drip stream has delivered to the bucket 4 a sufficient amount to overbalance the combined weight of the main and secondary scale-beams, said beams will move into the position shown in Fig. 1, thereby lifting the lever 32 from the post 29 and breaking the circuit of the magnet 17. The armature 16 being thus released, the levers 15 and 7 will instantly be drawn backward by the spring 42, thereby closing the valve 2 and completely shutting off the flow of material from the hopper. The backward movement of the lug 21 on the lever 15 will withdraw it from under the arm 19, the rotation of the shaft 9 will at once re-commence, and the operations above described, beginning with the dumping of the load from the bucket 4, will be repeated. The filled receptacle 52 may be withdrawn and replaced by an empty one either by hand or by any suitable automatic means.

It will be observed that in the machine above described, the downward movement of the weighing bucket is not required to operate any mechanical part whatever except the lifting of the light levers 31 and 32, there being thus eliminated sources of error found in those machines in which the dumping of the bucket and the opening and closing of the valve which controls the flow of material into the same are dependent for their operation upon power afforded by the loads of material weighed. By using power-driven mechanism for opening the valve I am enabled to apply to the said valve a closing force of sufficient magnitude to insure its instantaneous action upon the release of the closing device or devices by the movement of the scale. Any equivalent for the cam or levers for actuating the valve may be used, and any equivalent for the magnets 17 and 37 may be employed for restraining the action of the valve-actuating mechanism in the manner desired. I do not confine myself to the use of a valve of the character shown for controlling the flow of the material, but may use any means whereby the flow may be suitably varied.

The word "scale" is herein used to indicate any suitable weighing device having a moving part adapted to make or break an electric circuit by its movement.

In referring to the drawings in my description I have considered that part of the apparatus which contains the valve 2 to be the front of the machine, and any words referring to motion or location of parts are so to be understood.

I claim as my invention:

1. In an automatic weighing machine, the combination with a scale, of a valve, means constantly tending to close said valve, means for holding the valve from closing, power-driven mechanism for opening said valve, means operative with the initial movement of the scale to release and permit a partial closing of said valve, and means operative with a subsequent movement of said scale to permit the final closing of said valve.

2. In an automatic weighing machine, the combination with a scale, of a valve, and power-operated mechanism for opening the same, means constantly tending to close said valve, means for holding said valve from being closed by said closing means, means for arresting the closing movement of said valve prior to its final closing, means operative with the initial movement of said scale for permitting said closing movement, and means operative with the final movement of said scale for releasing said valve-arresting means.

3. In an automatic weighing machine, the combination with a scale of a valve controlling the delivery of material thereto, means constantly tending to close said valve, means for holding said valve from closing, power-driven mechanism for opening said valve, and means controlled by the movement of said scale for permitting the closing of said valve in steps.

4. In an automatic weighing machine, the combination with a scale of a valve, means constantly tending to close said valve, means for holding said valve from closing, power-driven means for opening said valve, and electrically controlled releasing devices, operative with the movements of said scale for permitting the closing of said valve in steps.

5. In an automatic weighing machine, the combination with a scale of a valve, means constantly tending to close the same, power-operated means for opening the valve, valve-controlling devices arranged to hold said valve in its full stream and drip stream positions respectively, and means operative with successive movements of the scale for causing said valve-controlling devices to release the valve.

6. In an automatic weighing machine, the combination with a valve, means constantly tending to close the same and means for restraining said valve from closing, of a scale comprising two independently movable beams, means operative with the movements of said beams respectively to secure a step-by-step closing movement of the valve, and positively driven mechanism for opening said valve.

7. In an automatic weighing machine, the combination with a valve and means constantly tending to close the same, of a scale comprising two beams one carried by the other, power-operated means for opening said valve, means operative with the movement of one of said beams for effecting a partial closing of the valve, and means operative with the movement of the other beam for effecting the final closing of said valve.

8. In an automatic weighing machine, the combination with a valve, means constantly tending to close the same, and means for restraining the valve from closing, of a scale comprising a main beam and a secondary beam, the latter being carried by the former, but being supported independently thereof during the initial movement of said main beam, means operative with the movement of said main beam to permit partial closing of said valve under the influence of the valve-closing means, and means operative on the movement of said secondary beam to permit final closing of said valve.

9. In an automatic weighing machine, the combination with a scale, of a valve, a spring-actuated lever constantly tending to close said valve, a power-driven shaft provided with a cam adapted to engage said lever and to operate the same against the force exerted by its actuating spring, means for stopping said shaft at different points in its rotation, an electromagnet arranged to control each of said stopping devices, and means operative with the movements of the scale for breaking the circuit through said magnets successively.

10. In an automatic weighing apparatus, the combination of a funnel provided at its bottom with a cup shaped plunger adapted to be inserted within the top of a receptacle, and means for forcing said plunger into the top of said receptacle, for the purpose set forth.

11. In an automatic weighing apparatus, a packing device consisting of a plunger having a central opening, a shoulder projecting outward from said opening, a rim extending downward from said shoulder, a support for a receptacle, and means for varying the relative elevation of the plunger and support, substantially as described.

12. In an automatic weighing machine, the combination of a weighing bucket having a discharge door, a latch carried by the bucket to lock said door in closed position, a combined latch-tripping and door-closing device independent of and normally disengaged from said latch and door, and means for positively operating said device after the bucket has descended.

13. In an automatic weighing machine, the combination with a plunger having a central opening, a shoulder projecting outward from said opening, a rim extending downward from said shoulder, and a funnel extending upward from said opening, of a support for a receptacle beneath the combined funnel and plunger and means for varying the relative elevation of said plunger and support.

14. In an automatic weighing machine, the combination of a scale beam, a weighing bucket carried thereby, a support located beneath the bucket and means for raising and depressing said support, and a combined funnel and packing device comprising a plunger having a central opening, a funnel extending upward therefrom, a shoulder projecting outward from said opening, and a rim extending downward from said shoulder.

15. In an automatic weighing machine, the combination with a weighing bucket having a hinged bottom provided with arms 45 and 49, of a latch 46 adapted to engage said arm 45, a lever 47 arranged to lift said latch and subsequently to engage said arm 49 and close said hinged bottom, and means for actuating said lever 47.

In testimony whereof, I have signed my name to this specification in the presence of two subscribing witnesses, on this twenty sixth day of August, A. D. 1897.

EDWARD G. THOMAS.

Witnesses:
 Wm. H. Mitchell,
 Ola W. Gay.